May 27, 1930.  W. C. HAHN  1,760,550
PROTECTIVE ARRANGEMENT
Filed Feb. 7, 1929  2 Sheets-Sheet 1

Inventor:
William C. Hahn,
by Charles E. Tullar
His Attorney.

May 27, 1930.  W. C. HAHN  1,760,550
PROTECTIVE ARRANGEMENT
Filed Feb. 7, 1929  2 Sheets-Sheet 2

Inventor:
William C. Hahn
by Charles E. Tullar
His Attorney.

Patented May 27, 1930

1,760,550

UNITED STATES PATENT OFFICE

WILLIAM C. HAHN, OF CHICAGO, ILLINOIS, ASSIGNOR TO GENERAL ELECTRIC COMPANY, A CORPORATION OF NEW YORK

PROTECTIVE ARRANGEMENT

Application filed February 7, 1929. Serial No. 338,304.

My invention relates to improvements in protective arrangements for electric circuits and more particularly for parallel lines and has for an object to provide an improved arrangement for selectively controlling the circuits in accordance with the balance of their currents and for simultaneously so controlling the circuits that any circuit can carry as much current as all together.

My invention will be better understood from the following description when considered in connection with the accompanying drawings and its scope will be pointed out in the appended claims.

Figure 1:
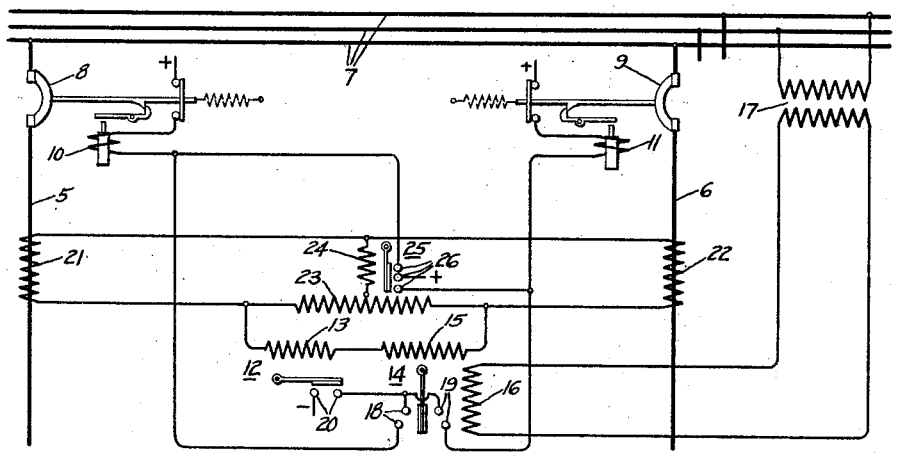
Figure 2:
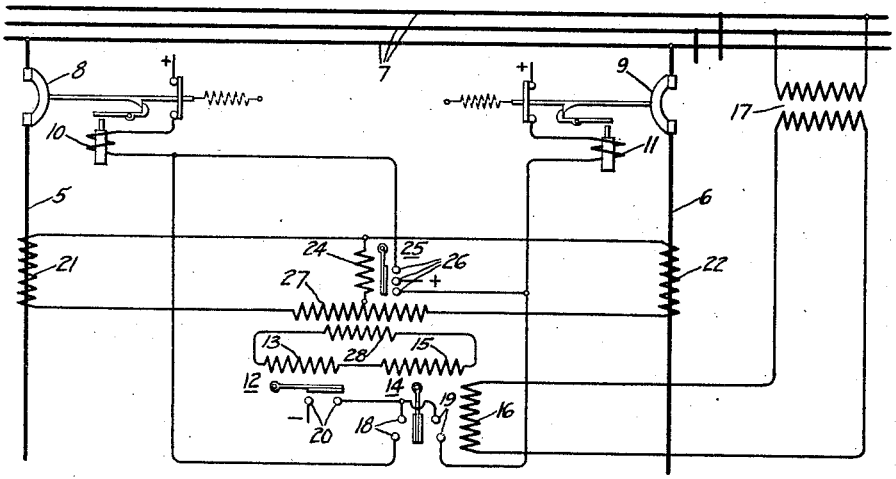
Figure 3:
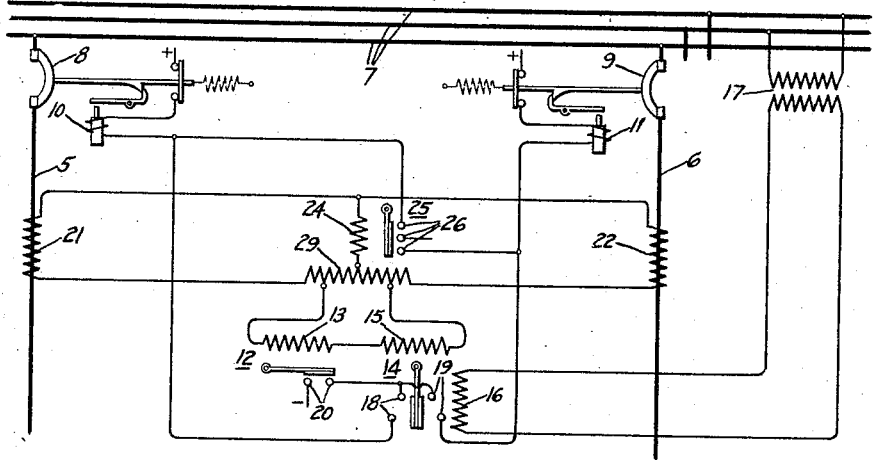
Figure 4:
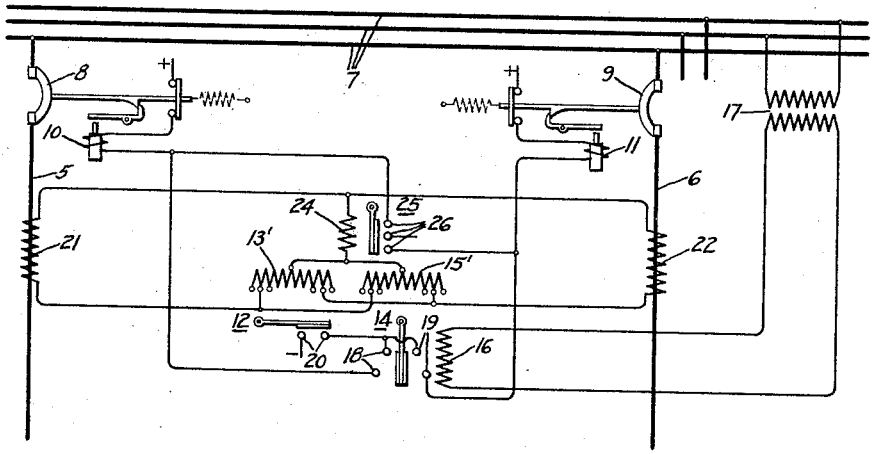

In the accompanying drawings, Fig. 1 illustrates diagrammatically, in single phase for clearness, an embodiment of my invention as applied to two parallel lines and Figs. 2, 3 and 4 illustrate diagrammatically, also in single phase modifications of the embodiment of my invention shown in Fig. 1.

Referring now to Fig. 1, two electric circuits such as parallel lines 5 and 6, of which only one phase conductor is shown, are arranged to be connected to a bus 7 through suitable circuit interrupters, herein shown as latched closed circuit breakers 8 and 9 having trip coils 10 and 11.

For selectively controlling the operation of the circuit breakers 8 and 9 in accordance with the balance between the currents in the lines 5 and 6, I provide in accordance with my invention a differential protective arrangement herein shown as including an overcurrent relay 12 having a winding 13 and a directional relay 14 having cooperating current and potential windings 15 and 16 respectively. The potential coil 16 is arranged to be energized from the bus 7 through suitable means such as a potential transformer 17. The directional relay 14 has two sets of contacts 18, 19 which are connected in series with the trip coils 10 and 11 respectively and in series with the contacts 20 of the overcurrent relay 12.

In order to control the opening of the circuit interrupters 8 and 9 in the line carrying the greater current when the difference between the line currents exceeds a predetermined value, the coil 13 of the overcurrent 12 and the current coil 15 of the directional relay 14 are arranged to be energized in accordance with the vectorial difference between the currents of corresponding phase conductors in the lines 5 and 6. For this purpose, the windings 13 and 15 are arranged to be energized from a protective circuit including the secondaries 21, 22 of current transformers energized respectively from the lines 5 and 6, the secondaries being connected in series for normally opposing electromotive forces. This protective circuit includes an inductive means having a winding 23 in series with the current transformer secondaries. The relay windings 13 and 15 are connected to be energized from the inductive winding 23 and for this purpose they may be connected across this winding in series relation with the protective circuit.

In order simultaneously to control the circuit breakers 8 and 9 so that either of the lines 5 or 6 can carry as much current as both together, I provide suitable means such as a connection across the protective circuit from an intermediate point of the inductive winding 23, the midpoint as shown in Fig. 1. This connection includes the winding 24 of an overcurrent relay 25 whose contacts 26 are arranged to control the circuits of the trip coils 10 and 11 whenever the current in the winding 24 exceeds a predetermined value.

With the connections as shown, the winding 24 is energized in accordance with the vectorial sum of the currents in the lines 5 and 6 and whenever this sum exceeds the value for which the relay 25 is set to operate the contacts 26 will be closed to effect the opening of the circuit breakers 8 and 9. Assuming substantially equal currents in the lines 5 and 6 in the same direction, then the two portions of the inductive winding 23 will be energized by equal currents flowing in opposite directions. Consequently, the resultant potential drop across the inductive winding 23 is substantially zero and the relay windings 13 and 15 remain deenergized. If, however, the current in one of the lines 5 or 6 exceeds that in the other then the reactances of the two portions of the inductive winding 23 become unbalanced and a resultant potential drop exists across the terminals of the inductive winding 23. Consequently, the relay windings, 13 and 15 connected across the inductance 23 are energized proportionately to the difference between the line currents. When this difference exceeds the predetermined value for which the relay 12 is set to operate, it will close its contacts 20. According to the direction of the current in the relay winding 15, that is, which of the lines 5 or 6 carries the greater current the relay 14 will operate to close its contacts 18 or 19 respectively. The simultaneous operation of the relays 12 and 14, therefore, selectively effects the opening of the circuit breaker 8 or 9 in accordance with which of the lines carries the greater current when the difference exceeds a predetermined value.

In the embodiment of my invention shown in Fig. 2, the inductive means is illustrated as mutually inductive in the form of a transformer whose primary winding 27 is connected in the same manner as the inductive winding 23 of Fig. 1. The secondary winding 28 has in circuit therewith the relay windings 13 and 15. Assuming that the turn ratio of the windings 27 and 28 is 2 to 1, then the relay windings 13 and 15 will be energized by a current which is substantially equal to the vectorial difference of the currents in the secondary of the current transformers 21 and 22. This will be apparent since one-half of the winding 27 will be energized by a current substantially equal to the current in the current transformer secondary 21 and the other half by a current substantially equal to the current in the current transformer secondary 22. The resultant effect of the winding 27 is, therefore, substantially equal to one-half the vectorial difference of the currents in the current transformer secondaries 21 and 22, that is, proportional to the vectorial difference of the line currents. This resultant effect by reason of the transformation ratio assumed appears in the secondary winding 28 and, therefore, the relay windings 13 and 15 as a current substantially equal to the vectorial sum of the line currents, that is, proportional to the vectorial sum of the line currents.

In Fig. 3 the inductive means is illustrated as comprising the winding 29 connected in the same manner as the inductive winding 23 of Fig. 1. In this arrangement the relay windings 13 and 15 are shown as connected between the quarter points of the inductive winding 29. This winding acts in effect as a 1 to 2 turn ratio autotransformer, one-half of the winding being energized by a current substantially equal to the current in the current transformer secondary 21 and the other half by a current substantially equal to the current in the current transformer secondary 22. The resultant effect of the whole winding is consequently substantially equal to one-half of the vectorial difference of the currents in the transformer secondaries 21 and 22 and by reason of the turn ratio assumed the current appearing in the relay coils 13 and 15 is twice as great so that the relays 12 and 14 are energized by a current substantially proportional to the vectorial difference of the line currents.

In the modification of my invention shown in Fig. 4, the relay windings 13', 15' of the relays 12 and 14 constitute in effect the inductive means. In this case the connection across the protective circuit including the winding 24 of the relay 25 is brought to the midpoints of the windings 13', 15' and each of these windings are provided with symmetrically disposed taps so that the relays can be adjusted and a balanced impedance effect maintained. In this case, a current proportional to the vectorial sum of the line currents appears in the relay winding 24 from which it flows in parallel to the midpoints of the relay windings 13', 15'. From these midpoints the sum current divides and returns to the respective current transformers 21 and 22. In so doing each of the windings 13', 15' is energized by currents flowing in the portions of the winding in such a way as to effect the energization of the winding in accordance with the vectorial difference of the line currents.

While I have shown and described my invention in considerable detail, I do not desire to be limited to the exact arrangements shown, but seek to cover in the appended claims all those modifications that fall within the true spirit and scope of my invention.

What I claim as new and desire to secure by Letters Patent of the United States, is:

1. In combination with two parallel lines and a circuit interrupter for each line, means for selectively controlling the opening of the circuit interrupter in the line carrying the greater current when the difference between the line currents exceeds a predetermined value and for controlling the opening of the circuit interrupter of each line when the sum of the line currents exceeds a predetermined value including current transformers respectively connected to be energized from said lines, a differential protective circuit including the secondaries of said transformers connected for normally opposing electromotive forces, an inductive winding connected in series in said circuit, a connection across said circuit from an intermediate point of said winding including a relay for controlling both of said circuit interrupters simultaneously and a relay having a winding connected to be energized from said inductive winding for selectively controlling said circuit interrupters.

2. In combination with two electric circuits and a circuit interrupter for each circuit means for selectively controlling the opening of the circuit interrupter in a faulty circuit and for controlling the opening of the circuit interrupters simultaneously including current transformers respectively connected to be energized from said circuits, a differential protective circuit including the secondaries of said transformers connected for normally opposing electromotive forces, a relay for selectively controlling the opening of said circuit interrupters in accordance with the difference between the currents of said electric circuits having a winding connected in series relation with said protective circuit, and a relay for controlling the opening of the circuit interrupters simultaneously in accordance with the sum of the currents of said electric circuit having a winding connected in shunt relation with said protective circuit.

3. In combination with two parallel lines and a circuit interrupter for each line, means for selectively controlling the opening of the circuit interrupter in the line carrying the greater current when the difference between the line currents exceeds a predetermined value and for controlling the opening of the circuit interrupters when the sum of the line currents exceeds a predetermined value including current transformers respectively connected to be energized from said lines, a differential protective circuit including the secondaries of said transformers connected for normally opposing electromotive forces, inductive means having a winding connected in series in said circuit, a connection across said circuit from an intermediate point of said inductive winding including a relay for controlling both of said circuit interrupters simultaneously and a relay having a winding connected to be energized from said inductive means for selectively controlling said circuit interrupters.

In witness whereof, I have hereunto set my hand this 31st day of January, 1929.

WILLIAM C. HAHN.